US010100743B2

(12) United States Patent
Bourgeois et al.

(10) Patent No.: US 10,100,743 B2
(45) Date of Patent: Oct. 16, 2018

(54) IGNITION DEVICE FOR AN AIRCRAFT ENGINE

(71) Applicant: Turbomeca, Bordes (FR)

(72) Inventors: Nicolas Bourgeois, Lons (FR); Benoît Grenier, Saint Castin (FR); Nicolas Guichemerre, Pau (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 261 days.

(21) Appl. No.: 14/917,812

(22) PCT Filed: Sep. 16, 2014

(86) PCT No.: PCT/FR2014/052308
§ 371 (c)(1),
(2) Date: Mar. 9, 2016

(87) PCT Pub. No.: WO2015/044557
PCT Pub. Date: Apr. 2, 2015

(65) Prior Publication Data
US 2016/0222887 A1 Aug. 4, 2016

(30) Foreign Application Priority Data
Sep. 26, 2013 (FR) ...................... 13 59261

(51) Int. Cl.
F23Q 3/00 (2006.01)
F02C 7/266 (2006.01)
(Continued)

(52) U.S. Cl.
CPC ............ *F02C 7/266* (2013.01); *F02P 15/003* (2013.01); *F02P 15/08* (2013.01); *F02P 15/02* (2013.01);
(Continued)

(58) Field of Classification Search
CPC ....................................................... F02C 7/266
See application file for complete search history.

(56) References Cited

U.S. PATENT DOCUMENTS

| 2,716,720 | A | 8/1955 | McNulty |
| 6,195,247 | B1* | 2/2001 | Cote ........................ F02C 7/26 |
| | | | 361/247 |

(Continued)

FOREIGN PATENT DOCUMENTS

| EP | 0 634 572 A1 | 1/1995 |
| EP | 2 375 031 A2 | 10/2011 |
| FR | 2 958 683 A1 | 10/2011 |

OTHER PUBLICATIONS

International Search Report dated Dec. 15, 2014, issued in corresponding International Application No. PCT/FR2014/052308, filed Sep. 16, 2014, 3 pages.

(Continued)

Primary Examiner — Stephen W Jackson
(74) Attorney, Agent, or Firm — Christensen O'Connor Johnson Kindness PLLC

(57) ABSTRACT

A device for igniting an aircraft engine, comprising at least two spark plugs, the device comprising a power supply, a first path for supplying a first spark plug with power and a second path for supplying a second spark plug with power, said paths being connected to the power supply by distribution means of the power supply which are controlled by a FADEC-type control system, wherein said distribution means comprise a first circuit that is configured to alternately supply said first path or said second path with power, and a second circuit for simultaneously supplying said first and second paths with power, the device being configured to use either the first circuit or the second circuit during start-up.

18 Claims, 2 Drawing Sheets

(51) Int. Cl.
 *F02P 15/00* (2006.01)
 *F02P 15/08* (2006.01)
 *F02P 15/02* (2006.01)
(52) U.S. Cl.
 CPC .... *F05D 2220/323* (2013.01); *F05D 2240/40* (2013.01); *F05D 2260/84* (2013.01)

(56) References Cited

U.S. PATENT DOCUMENTS

| 7,509,812 | B2 | 3/2009 | Mehrer et al. |
| 2011/0242724 | A1 | 10/2011 | Feau et al. |

OTHER PUBLICATIONS

Written Opinion of the International Searching Authority, issued in corresponding International Application No. PCT/FR2014/052308, filed Sep. 16, 2014, 5 pages.
Written Opinion of the International Searching Authority dated Dec. 15, 2014, issued in corresponding International Application No. PCT/FR2014/052308, filed Sep. 16, 2014, 5 pages.
International Preliminary Report on Patentability dated Mar. 29, 2016, issued in corresponding International Application No. PCT/FR2014/052308, filed Sep. 16, 2014, 1 page.

\* cited by examiner

IGNITION DEVICE FOR AN AIRCRAFT ENGINE

FIELD OF DISCLOSURE

Embodiments of the present disclosure relate to a device for igniting an engine which is in particular intended for supplying power to spark plugs. The device applies in particular to high-power generators for aircraft gas turbines.

BACKGROUND

When engines are started up, the spark plugs are supplied with electricity from an electrical power source in order to produce a spark which ignites a mixture of air and fuel in the engine. The spark is obtained from a capacitor which produces a high-voltage electrical discharge between the electrodes. Generally, all of the spark plugs are supplied with power by the same power source, the power source being capable of providing enough power to ignite several spark plugs simultaneously. In order to separately supply each spark plug with power, they are connected to the power source by a power-supply path that is separate from that of the other spark plugs.

Furthermore, the ignition device may be controlled by a control system, which sends the device requests to ignite one or more spark plugs by means of a signal circulating in an electrical connection. In aeronautics, high-power generators are for example controlled by electronic control systems of the FADEC type (full authority digital engine control). A FADEC is a multiple-channel computer which receives a limited amount of information from sensors, controllers, flight devices and the pilot. It analyzes these data and responds by sending control requests to the flight devices, in accordance with procedures stored in the FADEC.

In order to economize and to prevent wear of the spark plugs, it is advantageous to use a single spark plug at start-up, alternating the use thereof at each start-up.

U.S. Pat. No. 7,509,812 describes, for example, a device comprising a generator and a control system that is capable of managing the ignition of two spark plugs of the same engine. It in particular describes a method which makes it possible to ignite an engine using one first spark plug, and then to use a second spark plug to accelerate the engine to a rotational speed that is sufficient to maintain the ignited engine independently. A particular case in the method which is linked to a failure makes it possible to use the second spark plug to ignite the engine if the first spark plug is not operational.

In U.S. Pat. No. 6,195,247, the disclosure relates to an ignition circuit comprising two spark plugs, which has a control system comprising two channels which are connected to the ignition circuit by two double connections. Each channel is thus capable of managing the ignition of the two spark plugs, in order to ensure start-up against the risk of a malfunction of the other channel.

However, these devices use the control system to directly manage alternating the power supply to the spark plugs. The devices in particular need to use one channel of the control system for each of the paths for supplying the spark plugs with power, and this is disadvantageous for the control system, which is charged with managing other flight devices.

SUMMARY

A device is provided for igniting an aircraft engine, comprising at least two spark plugs, a power supply, a first path for supplying a first spark plug with power and a second path for supplying a second spark plug with power, the paths being connected to the power supply by distribution means of the power supply.

The device is remarkable in that the distribution means comprise a first circuit that is configured to alternately supply the first path or the second path with power, and a second circuit for simultaneously supplying the first and second paths with power, the device being configured to use either the first circuit or the second circuit during start-up.

Therefore, the device has its own distribution means which allow the device to start up the engine using a single spark plug owing to the first circuit, or using the two spark plugs simultaneously owing to the second circuit. The control system does not directly manage each path for igniting the spark plugs.

According to various embodiments of the disclosure, which may be taken together or separately:
  the distribution means comprise a first, monostable relay that is configured to connect either the first circuit or the second circuit to the power supply,
  the first, monostable relay is a time-delayed relay,
  the distribution means comprise a second, two-coil bistable relay that is configured to alternately connect the first circuit to the first path or to the second path,
  the distribution means comprise a third, bistable relay that is configured to alternate the connection of the two coils of the second, bistable relay to the power supply,
  a control system that is configured to organize the start-up of the engine the first circuit using a single electrical connection that is connected to the distribution means by an LP input,
  the LP input is configured to actuate the first, monostable relay and the third, bistable relay simultaneously,
  the control system is of the FADEC type,
  the control system is controlled by a low-voltage signal,
  the spark plugs are semi-conductor spark plugs,
  the ignition device is a high-power generator,
  the distribution means and the first and second paths are integrated in a high-power housing.

The disclosure also relates to an aircraft comprising such a device for igniting an engine.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
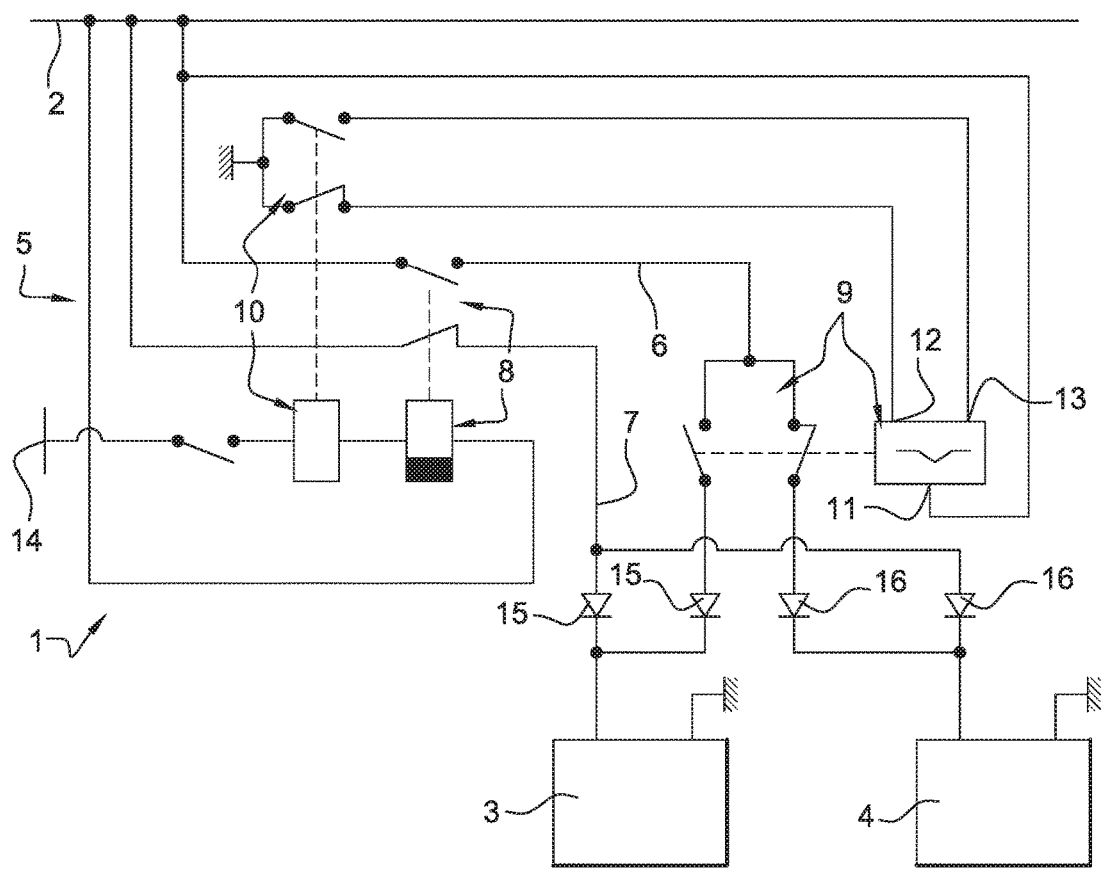
FIG. 1 schematically shows an ignition device according to a particular embodiment of the disclosure.

In FIG. 1, the ignition device 1 shown is a high-power generator of an aircraft engine. The generator comprises a power supply (not shown in FIG. 1), for example a battery which provides a voltage of 28 V over a phase 2 of the power supply, as well as a first path 3 for supplying a first spark plug with power and a second path 4 for supplying a second spark plug with power (the spark plugs are not shown in FIG. 1). The spark plugs may be conventional spark plugs having air between the electrodes, or semi-conductor spark plugs. Conventional spark plugs require a discharge voltage of approximately 20 kV, whereas semi-conductor spark plugs require a voltage of approximately 3 kV.

The first and second paths 3, 4 are connected to the power supply by distribution means 5 of the power supply comprising a first 6 and a second 7 circuit. The distribution means 5 and the first 3 and second 4 paths are preferably integrated in a high-power housing of the high-power generator.

In order to only use a single spark plug at start-up, the first circuit 6 is configured to supply the first path 3 or the second path 4 with power. Furthermore, the first and second paths 3, 4 are alternately supplied with power so that the spark plugs are used equally over time. However, the second circuit 7 is configured to simultaneously supply the two spark plugs with power by means of the first and second paths 3, 4.

The device 1 is configured to use either the first circuit 6 or the second circuit 7 during start-up. Therefore, during a normal start-up, the first circuit 6 is supplied with power such that it only uses a single spark plug. There are other situations, for example at very low temperatures, in which the two spark plugs are required to ensure the start-up of the engine. In this case, the device 1 uses the second circuit 7 to supply the two spark plugs with power simultaneously, and to thus start up the engine more easily.

For this purpose, the distribution means 5 comprise electrical relays 8, 9, 10 that are arranged on the first 6 and second 7 circuits, such that they direct the current provided by the power supply towards the selected circuit. The electrical relays 8, 9, 10 are components which allow electrical connections to be switched. There are, for example, electromechanical relays, comprising a coil which, when it is actuated, moves a mechanical element, such as a contact or a break switch, between two positions.

A first, monostable relay 8 connects the power supply either to the first circuit 6 or to the second circuit 7. A monostable relay 8 moves the contact between a first position when the coil is not supplied with power and a second position when the coil is supplied with power. The contact in the second position is only produced if the coil is supplied with power. Once it is no longer being supplied with power, the contact returns to the first position. The first relay 8 is arranged so as to be actuated at the start of the two power-supply circuits 6, 7.

Therefore, when the first relay 8 is actuated, the power supply of the spark plug is produced on a single spark plug, in an alternating mode. When the first relay 8 is no longer actuated, the power supply of the two spark plugs is produced simultaneously.

Advantageously, the first, monostable relay 8 is a time-delayed relay, in order to allow time for the first circuit 6 to connect to the path 3, 4 of the spark plug to be supplied with power, and to thus avoid the risk of supplying the other spark plug with power in error.

The distribution means 5 comprise a second, two-coil bistable relay 9 that is configured to alternately connect the first circuit 6 to the first path 3 or to the second path 4. A bistable relay comprises the same elements as a monostable relay, except that it stays in position when the coil is no longer being supplied with power. For a two-coil bistable relay, a first coil turns on the ignition in the first position when it is supplied with power, and the second coil turns on the ignition in the second position when it is supplied with power. In order to turn on the ignition in the desired position, it is necessary to supply the corresponding coil with power.

In FIG. 1, the second, two-coil bistable relay 9 has three connections 11, 12, 13, a first connection 11 being connected both to the phase 2 of the power supply and to the two coils. The two other connections 12, 13 each connect one of the coils to the ground.

The distribution means comprise a third, bistable relay 10 that alternates the connection of the two coils of the second, bistable relay 9 to the phase 2 of the power supply. For this purpose, the third, bistable relay 10 has a first position which connects the first coil of the second, bistable relay 9 to the ground, and a second position which connects the second coil of the second, bistable relay to the ground. For the two positions, only one coil is supplied with power, the other coil not being connected to the phase 2 of the power supply. In the case of a single spark plug being supplied with power, the third, bistable relay 10 is used to automatically bring about the change in contact of the second, bistable relay 9, and therefore has an effect on the change of the path 3, 4 to be supplied with power.

The ignition device 1 also comprises a control system (not shown in FIG. 1) of the FADEC type, which is configured to control the start-up of the engine in an alternated mode by means of the first circuit 6. The control system is connected to the distribution means 5 by a single electrical connection, via an LP-type input 14 (LP standing for low power), which is intended to transmit a low-voltage signal. Therefore, just one control-system channel is used to connect the control system to the high-power generator.

The LP input 14 makes it possible to actuate the first, monostable relay 8 and the third, bistable relay 10 in a substantially simultaneous manner. When the LP input 14 receives a signal, the first 8 and the third 10 relays are actuated. The first, monostable relay 8 connects the first circuit 6 to the phase 2 of the power supply for a start-up using a single spark plug, and the third, bistable relay 10 changes the coil of the second, bistable relay 9, which is connected to the power supply by means of the connections 11, 12, 13. Therefore, this change in power supply of the coil brings about a change to the contact of the second, bistable relay 9, and therefore alternates the power-supply path 3, 4 of the spark plugs.

As soon as a signal is transmitted to the LP input 14, the first circuit 6 is selected, and the spark plug that is used for start-up is automatically alternated. However, if no signal is sent to the LP input 14, it is the second circuit 7 that supplies the two coils with power simultaneously, which serves to ignite the spark plugs.

The circuits 6, 7 further comprise diodes 15, 16 which prevent the current circulating in one of the circuits 6, 7 from passing into the other circuit in the opposite direction. The first and second circuits 6, 7 are connected in the region of the two paths 3, 4 for supplying the spark plugs with power.

Figure 2:
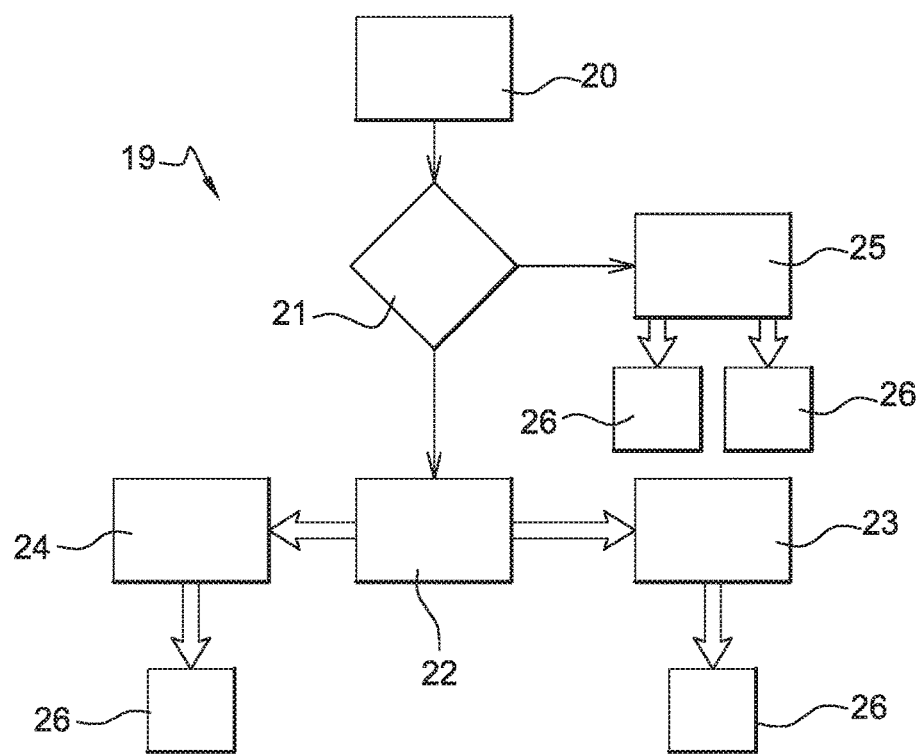
FIG. 2 is a block diagram of a method according to a particular embodiment of the disclosure.

The method 19, shown in FIG. 2 and associated with the use of the ignition device 1 for an engine comprising two spark plugs, comprises the steps of:

a) controlling the start-up of the engine 20, b) verifying that an alternated control mode is requested 21, c) if condition b) is satisfied, selecting a first spark plug 22, selecting the spark plug that has not been used during the previous alternated start-up, d) moving the connection of the power supply over to the path of the spark plug selected in step c) 23, 24, e) if condition b) is not satisfied, moving the connection of the power supply over to the paths of the two spark plugs 25, f) supplying the spark plug(s) that are connected to the power supply 26 with power.

This method 19 thus makes it possible to automatically pass from an alternated start-up mode of the spark plugs of an engine to a simultaneous start-up mode of the spark plugs, and vice versa. In addition, it is sufficient to have a single piece of information regarding the control of one of the modes, in this case the simultaneous mode, in order to define the start-up mode of the engine.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A device for igniting an aircraft engine, comprising: at least two spark plugs, a power supply, a first path for supplying a first spark plug with power and a second path for supplying a second spark plug with power, said paths being connected to the power supply by a distributor of the power supply, wherein said distributor comprises a first circuit that is configured to alternately supply said first path or said second path with power, and a second circuit for simultaneously supplying said first and second paths with power, wherein the device is configured to use either the first circuit or the second circuit during start-up.

2. The device for igniting an aircraft engine according to claim 1, wherein the distributor comprises a first, monostable relay that is configured to connect either the first circuit or the second circuit to the power supply.

3. The device for igniting an aircraft engine according to claim 2, wherein the first, monostable relay is a time-delayed relay.

4. A device for igniting an aircraft engine according to claim 2, wherein the distributor comprises a second, two-coil bistable relay that is configured to alternately connect the first circuit to the first path or to the second path.

5. The device for igniting an aircraft engine according to claim 4, wherein the distributor comprises a third, bistable relay that is configured to alternate the connection of the two coils of the second, bistable relay to the power supply.

6. The device for igniting an aircraft engine according to claim 5, comprising a control system that is capable of organising the start-up of the engine by the first circuit using a single electrical connection that is connected to said distributor by an input for transmitting a low-voltage signal.

7. The device for igniting an aircraft engine according to claim 6, wherein the input is configured to actuate the first, monostable relay and the third, bistable relay simultaneously.

8. The device for igniting an aircraft engine according to claim 7, wherein the control system is a multiple-channel computer.

9. A device for igniting an aircraft engine according to claim 1, wherein the spark plugs are semi-conductor spark plugs.

10. The device for igniting an aircraft engine according to claim 1, wherein the ignition device is a high-power generator.

11. The device for igniting an aircraft engine according to claim 10, wherein the distributor and the first and second paths are integrated in a high-power housing.

12. An aircraft comprising a device for igniting an aircraft engine according to claim 1.

13. A device for igniting an aircraft engine, comprising:
a power supply;
a first path configured to supply power to a first spark plug and a second path configured to supply power to a second spark plug, said first and second paths being connected to the power supply by a distributor of the power supply,
wherein said distributor comprises a first circuit having a first switch that is configured to alternately supply power to said first path or to said second path, and further comprises a second circuit configured to simultaneously supply power to said first and second paths, wherein the device is configured to use either the first circuit or the second circuit during start-up.

14. The device for igniting an aircraft engine according to claim 13, wherein the distributor comprises a second switch that is configured to connect either the first circuit or the second circuit to the power supply.

15. The device for igniting an aircraft engine according to claim 14, wherein the distributor comprises a third switch that is configured to control the first switch in order to alternate connection of the first and second paths to the power supply.

16. The device for igniting an aircraft engine according to claim 15, wherein the distributor is configured such that the second switch and the third switch are actuated simultaneously.

17. The device for igniting an aircraft engine according to claim 15, wherein at least one of the first switch, the second switch and the third switch includes a relay.

18. The device for igniting an aircraft engine according to claim 15, wherein the second switch includes a time-delayed relay.

* * * * *